United States Patent
Koh et al.

(10) Patent No.: US 9,659,518 B2
(45) Date of Patent: May 23, 2017

(54) DISPLAY PANEL AND DISPLAY APPARATUS HAVING INTERLACE AND PROGRESSIVE DRIVING METHODS

(71) Applicant: SAMSUNG DISPLAY CO., LTD., Yongin, Gyeonggi-Do (KR)

(72) Inventors: Jai-Hyun Koh, Hwaseong-si (KR); Heen-Dol Kim, Yongin-si (KR); Kuk-Hwan Ahn, Hwaseong-si (KR); Ik-Soo Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 57 days.

(21) Appl. No.: 14/666,227

(22) Filed: Mar. 23, 2015

(65) Prior Publication Data

US 2016/0055784 A1 Feb. 25, 2016

(30) Foreign Application Priority Data

Aug. 20, 2014 (KR) .......................... 10-2014-0108563

(51) Int. Cl.
| | | |
|---|---|---|
| *G09G 3/36* | (2006.01) | |
| *G09G 3/20* | (2006.01) | |
| *G06F 1/32* | (2006.01) | |
| *G06T 7/40* | (2017.01) | |
| *G06T 7/90* | (2017.01) | |

(52) U.S. Cl.
CPC ............. *G09G 3/2003* (2013.01); *G06F 1/32* (2013.01); *G06T 7/408* (2013.01); *G06T 7/90* (2017.01); *G09G 3/3648* (2013.01); *G09G 3/3614* (2013.01); *G09G 2300/0426* (2013.01); *G09G 2310/0213* (2013.01); *G09G 2310/0224* (2013.01); *G09G 2330/021* (2013.01); *G09G 2360/16* (2013.01)

(58) Field of Classification Search
CPC .................................................... G09G 3/2003
USPC ....................................................... 345/96, 99
See application file for complete search history.

(56) References Cited

U.S. PATENT DOCUMENTS

| | | | |
|---|---|---|---|
| 6,326,997 B1 * | 12/2001 | Nam .................... | H04N 1/2112 348/231.1 |
| 2007/0222733 A1 | 9/2007 | Ju et al. | |
| 2008/0151080 A1 * | 6/2008 | Osaka ..................... | G06T 5/002 348/241 |
| 2008/0186413 A1 * | 8/2008 | Someya ................... | H04N 9/68 348/739 |
| 2010/0277463 A1 | 11/2010 | Yen et al. | |

(Continued)

FOREIGN PATENT DOCUMENTS

| | | |
|---|---|---|
| EP | 2065876 A2 | 6/2009 |
| KR | 10-2008-0099534 A | 11/2008 |
| WO | WO 2009/096186 A1 | 8/2009 |

OTHER PUBLICATIONS

EP Search Report for corresponding EP Application No. 15169433.8, issued on Sep. 16, 2015 (6 pages).

*Primary Examiner* — Long D Pham
(74) *Attorney, Agent, or Firm* — Lewis Roca Rothgerber Christie LLP

(57) ABSTRACT

A method of driving a display panel, the method including analyzing input image data, determining a driving method of the display panel as one of a progressive driving method and an interlace driving method, and rearranging the input image data according to the determined one of the progressive driving method and the interlace driving method.

18 Claims, 11 Drawing Sheets

(56) References Cited

U.S. PATENT DOCUMENTS

| | | | | |
|---|---|---|---|---|
| 2011/0242140 A1* | 10/2011 | Lee | .................. | G09G 3/3648 |
| | | | | 345/690 |
| 2012/0219052 A1* | 8/2012 | Wakuda | .............. | H04N 19/172 |
| | | | | 375/240.01 |
| 2012/0268707 A1* | 10/2012 | Yamashita | .......... | G09G 3/3607 |
| | | | | 349/143 |
| 2013/0241959 A1* | 9/2013 | Ge | .................. | G09G 3/3614 |
| | | | | 345/690 |
| 2014/0184655 A1* | 7/2014 | Jang | .................. | G09G 3/3208 |
| | | | | 345/690 |
| 2015/0170590 A1 | 6/2015 | Ahn et al. | | |

* cited by examiner

DISPLAY PANEL AND DISPLAY APPARATUS HAVING INTERLACE AND PROGRESSIVE DRIVING METHODS

CROSS-REFERENCE TO RELATED APPLICATION

This application claims priority to and the benefit of Korean Patent Application No. 10-2014-0108563, filed on Aug. 20, 2014 in the Korean Intellectual, Property Office KIPO, the content of which is herein incorporated by reference in its entirety.

BACKGROUND

1. Field

Example embodiments of the present inventive concept relate to a method of driving a display panel and a display apparatus for performing the method. More particularly, example embodiments of the present inventive concept relate to a method of driving a display panel for reducing power consumption and a display apparatus for performing the method.

2. Description of the Related Art

Generally, a display apparatus includes a display panel displaying an image and a panel driver driving the display panel. The panel driver includes a timing controller, a gate driver, and a data driver.

For example, a difference of a data signal outputted from the data driver to the display panel between adjacent pixels is relatively high when the data signal oscillates between a high level and a low level. When the difference of the data signal outputted from the data driver to the display panel between adjacent pixels is relatively high, the power consumption of the display apparatus may increase.

When the display panel frequently displays a pattern having the data signal, which oscillates between a high level and a low level, the power consumption of the display apparatus may further increase.

SUMMARY

Aspects of embodiments of the present inventive concept are directed toward a method of driving a display panel capable of reducing power consumption and improving display quality.

Aspects of embodiments of the present inventive concept are also directed toward a display apparatus for performing the above-mentioned method.

According to aspects of embodiments of the present invention, there is provided a method of driving a display panel, the method including: analyzing input image data; determining a driving method of the display panel as one of a progressive driving method and an interlace driving method; and rearranging the input image data according to the determined one of the progressive driving method and the interlace driving method.

In an embodiment, the analyzing of the input image data including: determining saturation of pixels; generating a saturation histogram of the pixels; and determining a saturation value of a frame based on the saturation histogram.

In an embodiment, a pixel of the pixels includes a red subpixel, a green subpixel and a blue subpixel, and the saturation of the pixel is determined utilizing a ratio between a minimum value among a grayscale level of the red subpixel, a grayscale level of the green subpixel, and a grayscale level of the blue subpixel, and a maximum value among the grayscale level of the red subpixel, the grayscale level of the green subpixel and the grayscale level of the blue subpixel.

In an embodiment, the generating of the saturation histogram of the pixels includes setting weights of various colors.

In an embodiment, the determining of the driving method of the display panel includes comparing the saturation value of the frame to a saturation threshold.

In an embodiment, the determining of the driving method of the display panel further includes: determining the driving method as the interlace driving method when the saturation value of the frame is greater than the saturation threshold, and determining the driving method as the progressive driving method when the saturation value of the frame is equal to or less than the saturation threshold.

In an embodiment, the determining the driving method of the display panel further includes determining whether or not the input image data generates an interlace defect when the saturation value of the frame is greater than the saturation threshold.

In an embodiment, the interlace defect is a combing defect, and the combing defect is generated when an object in the input image data rapidly displaces and a boundary line of the object of an odd image defined by an odd numbered gate line is different from a boundary line of the object of an even image defined by an even numbered gate line.

In an embodiment, the determining of the driving method of the display panel further includes: determining the driving method as the progressive driving method when the saturation value of the frame is greater than the saturation threshold and the interlace defect is generated, and determining the driving method as the interlace driving method when the saturation value of the frame is greater than the saturation threshold and the interlace defect is not generated.

In an embodiment, the analyzing the input image data includes: calculating a difference of data signals of adjacent subpixels coupled to a same data line; and accumulating the difference of the data signals of the adjacent subpixels.

In an embodiment, the determining of the driving method of the display panel further includes: determining the driving method as the interlace driving method when the accumulated difference of the data signals is greater than a threshold, and determining the driving method as the progressive driving method the accumulated difference of the data signal is equal to or less than the threshold.

In an embodiment, the display panel includes a plurality of subpixels including a red subpixel, a green subpixel and a blue subpixel, a data line of the display panel is alternately coupled to the subpixels in adjacent two subpixel columns, and a polarity of a data signal applied to a first data line is different from a polarity of a data signal applied to a second data line.

In an embodiment, a P-th data line of the display panel is coupled to a red subpixel in a first subpixel row and a P-th subpixel column, a blue subpixel in a second subpixel row and a (P−1)-th subpixel column, a red subpixel in a third subpixel row and the P-th subpixel column and a blue subpixel in a fourth subpixel row and the (P−1)-th subpixel column, a (P+1)-th data line of the display panel is coupled to a green subpixel in the first subpixel row and a (P+1)-th subpixel column, a red subpixel in the second subpixel row and the P-th subpixel column, a green subpixel in the third subpixel row and the (P+1)-th subpixel column and a red subpixel in the fourth subpixel row and the P-th subpixel column, and a (P+2)-th data line of the display panel is coupled to a blue subpixel in the first subpixel row and a (P+2)-th subpixel column, a green subpixel in the second subpixel row and the (P+1)-th subpixel column, a blue subpixel in the third subpixel row and the (P+2)-th subpixel column and a green subpixel in the fourth subpixel row and the (P+1)-th subpixel column.

In an embodiment, the analyzing the input image data includes: determining saturation of pixels; and generating a saturation histogram of the pixels, wherein the generating the saturation histogram of the pixels includes setting weights of colors, and wherein the weights for red, green, blue, cyan, magenta and yellow are substantially the same.

In an embodiment, the display panel includes a red subpixel, a green subpixel and a blue subpixel, a data line of the display panel is sequentially coupled to the subpixels in one subpixel column, a polarity of a data signal applied to a first data line is a same as a polarity of a data signal applied to a second data line adjacent to the first data line, and a polarity of a data signal applied to a third data line adjacent to the second data line and a polarity of a data signal applied to a fourth data line adjacent to the third data line are different from the polarity of the data signal applied to the first data line.

In an embodiment, a first subpixel row of the display panel sequentially includes a first red subpixel, a first green subpixel, a first blue subpixel and a first white subpixel, and a second subpixel row of the display panel sequentially includes a second blue subpixel, a second white subpixel, a second red subpixel and a second green subpixel.

In an embodiment, the analyzing the input image data includes: determining saturation of pixels; and generating a saturation histogram of the pixels, wherein the generating the saturation histogram of the pixels includes setting weights of various colors, and wherein a weight for cyan and yellow is a first weight, a weight for red, green and blue is a second weight less than the first weight, and a weight for magenta is zero.

In an embodiment, the method further includes compressing the input image when the display panel is driven in the interlace driving method; and storing the compressed input image to a memory.

According to aspects of embodiments of the present invention, there is provided a display apparatus including: a display panel driver including an image analyzing part configured to analyze input image data; a driving method determining part configured to determine a driving method of the display panel as one of a progressive driving method and an interlace driving method; and an image processing part configured to rearrange the input image data according to the determined one of the progressive driving method and the interlace driving method; and a display panel configured to display image based on a data signal outputted from the image processing part.

According to the embodied method of driving the display panel and the display apparatus for performing the embodied display panel, an interlace driving method is selectively applied according to input image data so that a power consumption may be reduced. In addition, when an interlace defect is generated due to the interlace driving method, a progressive driving method is applied so that the display defect may be prevented. Thus, a display quality of the display panel may be improved.

BRIEF DESCRIPTION OF THE DRAWINGS

The above and other features and advantages of the present inventive concept will become more apparent by describing in detailed example embodiments thereof with reference to the accompanying drawings, in which.

DETAILED DESCRIPTION

Figure 1:
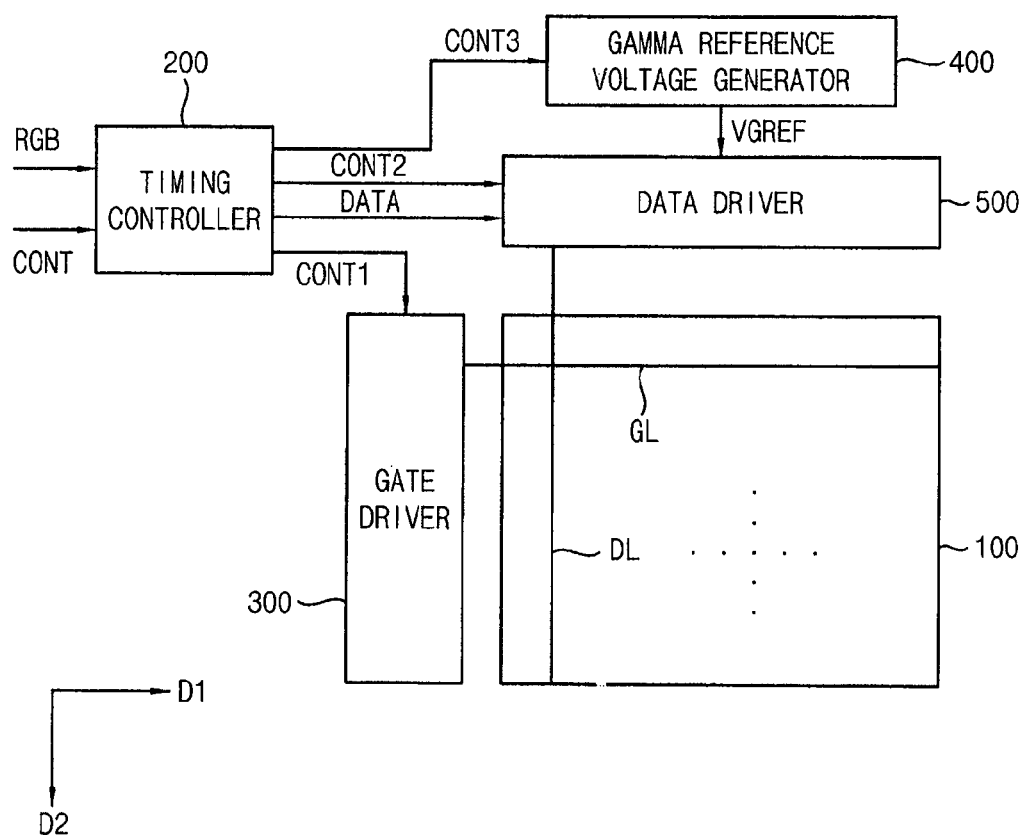
FIG. 1 is a block diagram illustrating a display apparatus, according to an example embodiment of the present inventive concept.

Hereinafter, the present inventive concept will be explained in more detail with reference to the accompanying drawings.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

FIG. 1 is a block diagram illustrating a display apparatus, according to an example embodiment of the present inventive concept.

Referring to FIG. 1, the display apparatus includes a display panel 100 and a panel driver. The panel driver includes a timing controller 200, a gate driver 300, a gamma reference voltage generator 400, and a data driver 500.

The display panel 100 has a display region on which an image is displayed and a peripheral region adjacent to the display region.

The display panel 100 includes a plurality of gate lines GL, a plurality of data lines DL and a plurality of subpixels coupled to (e.g., connected to) the gate lines GL and the data lines DL. The gate lines GL extend in a first direction D1 and the data lines DL extend in a second direction D2 crossing the first direction D1.

Each subpixel includes a switching element, a liquid crystal capacitor and a storage capacitor. The liquid crystal capacitor and the storage capacitor are electrically coupled to the switching element. The subpixels may be arranged (e.g., disposed) in a matrix form.

Figure 2A:
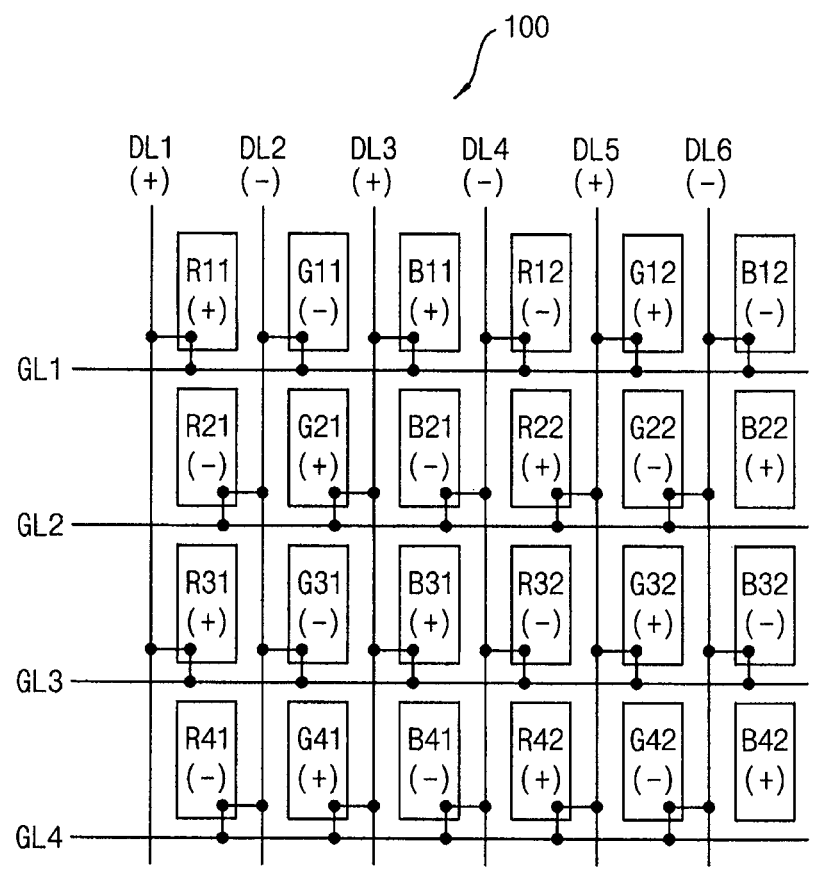
FIG. 2A is a plan view illustrating a pixel structure of a display panel of FIG. 1 when the display panel of FIG. 1 displays a full white image.
Figure 3A:
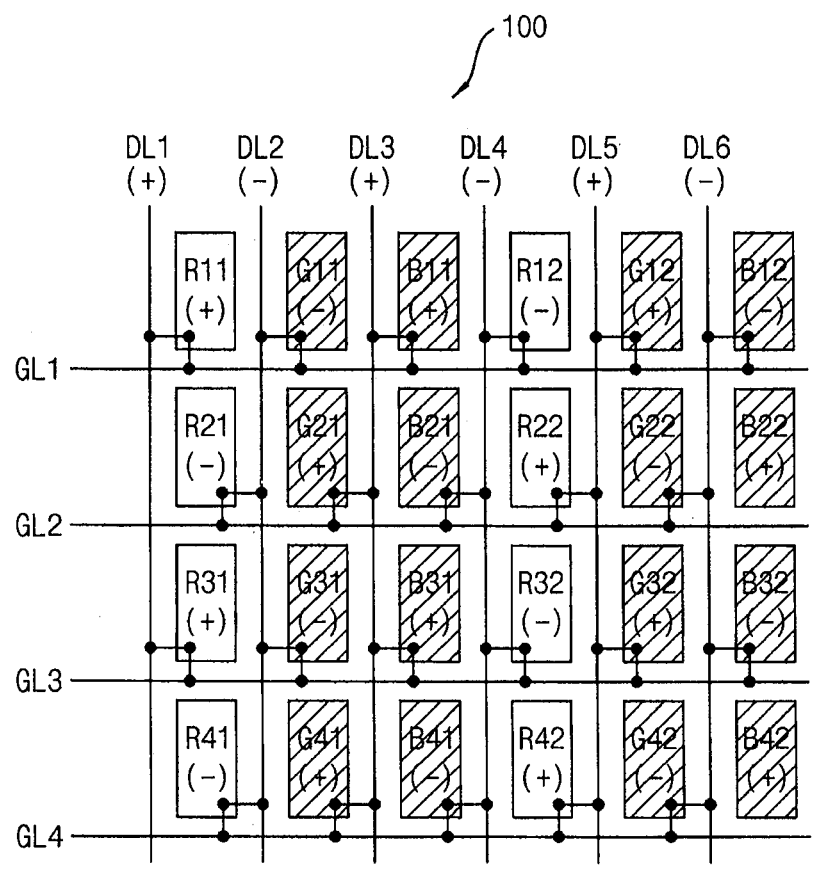
FIG. 3A is a plan view illustrating a pixel structure of the display panel of FIG. 1 when the display panel of FIG. 1 displays a red image, according to an example embodiment of the present inventive concept.

The pixel structure of the display panel 100 may be explained in more detail in reference to FIGS. 2A and 3A.

The timing controller 200 receives input image data RGB and an input control signal CONT from an external apparatus. The input image data may include red image data R, green image data G, and blue image data B. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3 and a data signal DATA based on the input image data RGB and the input control signal CONT.

The timing controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The timing controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The timing controller 200 generates the data signal DATA based on the input image data RGB. The timing controller 200 outputs the data signal DATA to the data driver 500.

The timing controller 200 determines a driving method according to the input image data RGB. The timing controller 200 may select one of a progressive driving method and an interlace driving method according to the input image data RGB.

The timing controller 200 generates the third control signal CONT3 for controlling an operation of the gamma reference voltage generator 400 based on the input control signal CONT, and outputs the third control signal CONT3 to the gamma reference voltage generator 400.

Figure 4:
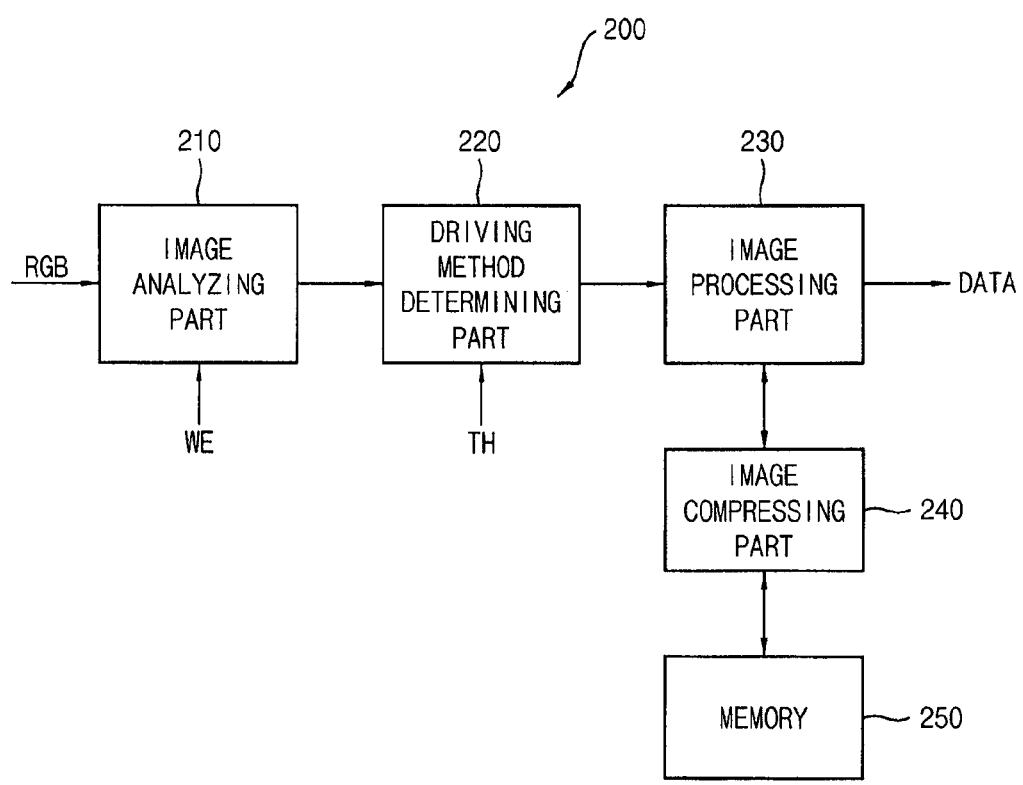
FIG. 4 is a block diagram illustrating a timing controller of FIG. 1, according to an example embodiment of the present inventive concept.
Figure 5:
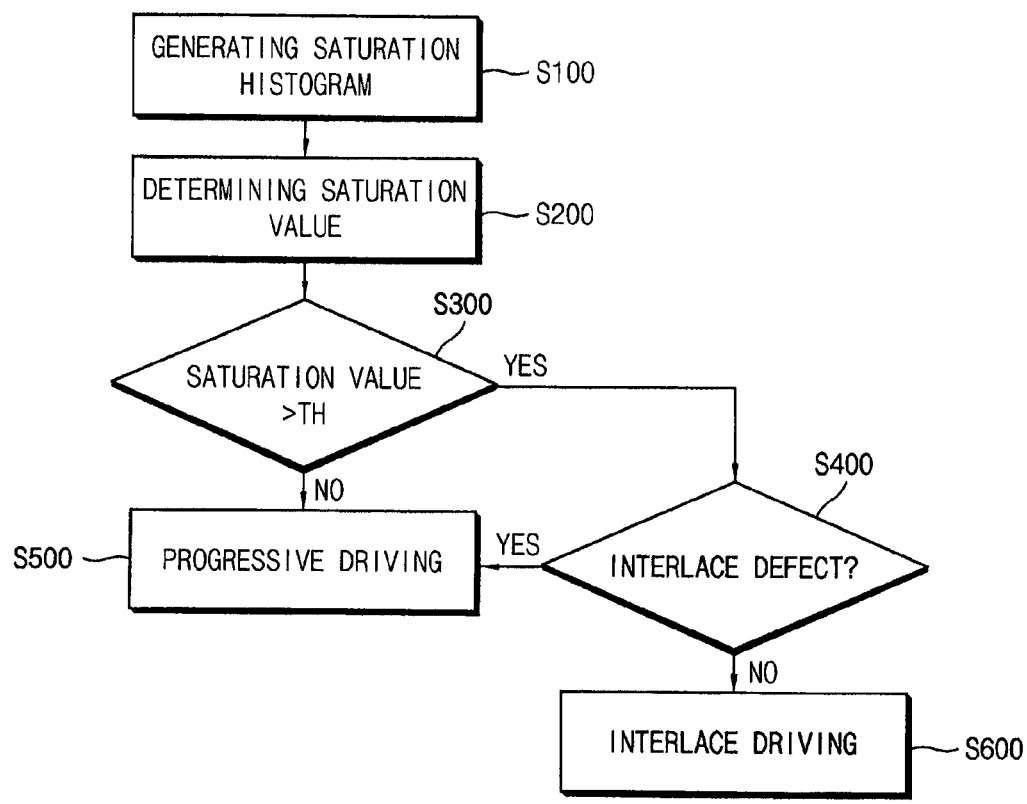
FIG. 5 is a flowchart illustrating an operation of the timing controller of FIG. 1, according to an example embodiment of the present inventive concept.

A structure and an operation of the timing controller 200 are explained in more detail in reference to FIGS. 4 to 5 in detail.

The gate driver 300 generates gate signals driving the gate lines GL in response to the first control signal CONT1 received from the timing controller 200. The gate driver 300 sequentially outputs the gate signals to the gate lines GL.

The gate driver 300 may be directly mounted on the display panel 100, or may be coupled to the display panel 100 as a tape carrier package (TCP) type. Alternatively, the gate driver 300 may be integrated on the display panel 100.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value corresponding to a level of the data signal DATA.

In an example embodiment, the gamma reference voltage generator 400 may be located (e.g., disposed) in the timing controller 200, or in the data driver 500.

The data driver 500 receives the second control signal CONT2 and the data signal DATA from the timing controller 200, and receives the gamma reference voltages VGREF from the gamma reference voltage generator 400. The data driver 500 converts the data signal DATA into analog data voltages (e.g., data voltages of an analog or non-binary type) using the gamma reference voltages VGREF. The data driver 500 outputs the data voltages to the data lines DL.

The data driver 500 may be directly mounted on the display panel 100, or be coupled to the display panel 100 as a TCP. Alternatively, the data driver 500 may be integrated with the display panel 100.

Figure 2B:
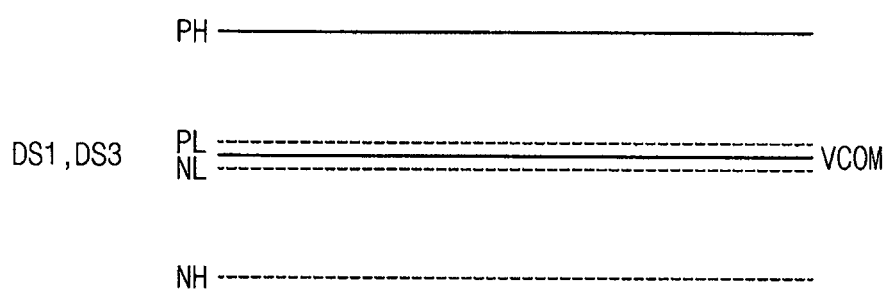
FIG. 2B is a waveform diagram illustrating a first data signal and a third data signal when the display panel of FIG. 1 displays the full white image.
Figure 2C:
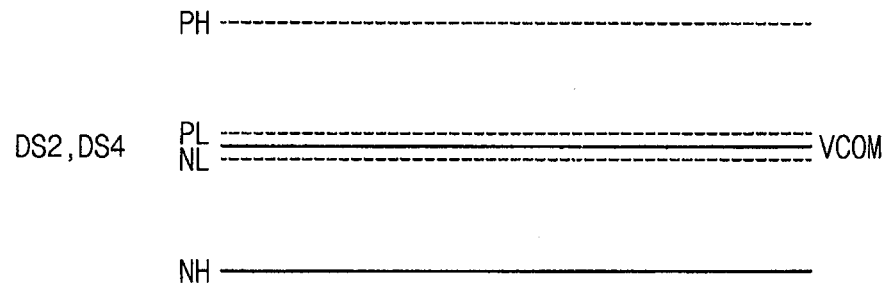
FIG. 2C is a waveform diagram illustrating a second data signal and a fourth data signal when the display panel of FIG. 1 displays the full white image.
Figure 3B:
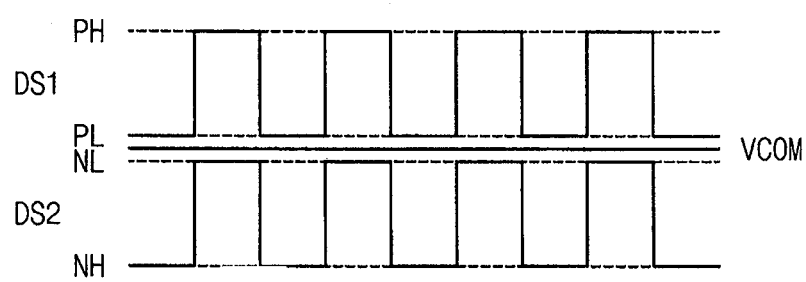
FIG. 3B is a waveform diagram illustrating a first data signal and a third data signal when the display panel of FIG. 1 displays the red image.
Figure 3C:
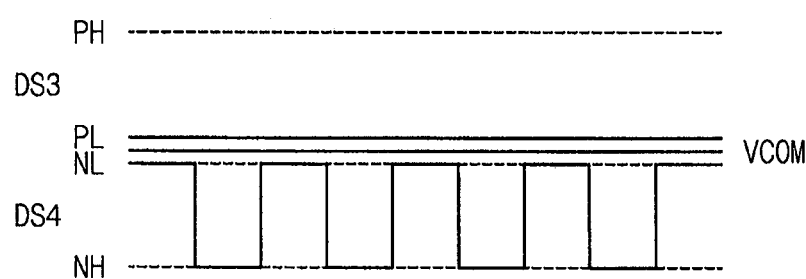
FIG. 3C is a waveform diagram illustrating a second data signal and a fourth data signal when the display panel of FIG. 1 displays the red image.

FIG. 2A is a plan view illustrating a pixel structure of a display panel of FIG. 1 when the display panel of FIG. 1 displays a full white image. FIG. 2B is a waveform diagram illustrating a first data signal and a third data signal when the display panel of FIG. 1 displays the full white image. FIG. 2C is a waveform diagram illustrating a second data signal and a fourth data signal when the display panel of FIG. 1 displays the full white image. FIG. 3A is a plan view illustrating a pixel structure of the display panel of FIG. 1 when the display panel of FIG. 1 displays a red image, according to an example embodiment of the present inventive concept. FIG. 3B is a waveform diagram illustrating a first data signal and a third data signal when the display panel of FIG. 1 displays the red image. FIG. 3C is a waveform diagram illustrating a second data signal and a fourth data signal when the display panel of FIG. 1 displays the red image.

Referring to FIGS. 1 to 3C, the display panel 100 includes a red subpixel, a green subpixel and a blue subpixel. A data line of the display panel 100 is alternately coupled to (e.g., connected to) the subpixels in adjacent two subpixel columns. A polarity of a data signal applied to a first data line DL1 is different from a polarity of a data signal applied to a second data line DL2 adjacent to the first data line DL1. Therefore, the display panel 100 is driven in a column inversion method in an aspect of the data line. However, the data lines are coupled to the subpixels in adjacent subpixel columns so that the display panel 100 is driven in a dot inversion method in an aspect of the pixel.

A P-th data line of the display panel 100 is coupled to a red subpixel in a first subpixel row and a P-th subpixel column, a blue subpixel in a second subpixel row and a (P−1)-th subpixel column, a red subpixel in a third subpixel row, and the P-th subpixel column and a blue subpixel in a fourth subpixel row and the (P−1)-th subpixel column.

A (P+1)-th data line of the display panel 100 is coupled to a green subpixel in the first subpixel row and a (P+1)-th subpixel column, a red subpixel in the second subpixel row and the P-th subpixel column, a green subpixel in the third subpixel row and the (P+1)-th subpixel column and a red subpixel in the fourth subpixel row and the P-th subpixel column.

A (P+2)-th data line of the display panel 100 is coupled to a blue subpixel in the first subpixel row and a (P+2)-th subpixel column, a green subpixel in the second subpixel row and the (P+1)-th subpixel column, a blue subpixel in the third subpixel row and the (P+2)-th subpixel column, and a green subpixel in the fourth subpixel row and the (P+1)-th subpixel column.

In FIG. 2A, the display panel 100 displays a full white image. Thus, the red subpixels, the green subpixels, and the blue subpixels have high grayscale levels. In FIG. 2A, the display panel 100 is driven in a progressive driving method so that first to N-gate lines are progressively (e.g., successively) turned ON.

In FIG. 2B, the voltage of the first data line DL1 has a positive polarity and a first data signal DS1 applied to the first data line DL1 maintains a high grayscale level PH of positive polarity. The voltage of the third data line DL3 has a positive polarity, and a third data signal DS3 applied to the third data line DL3 maintains a high grayscale level PH of positive polarity.

In FIG. 2C, the second data line DL2 has a negative polarity, and a second data signal DS2 applied to the second data line DL2 maintains a high grayscale level NH of the negative polarity. The fourth data line DL4 has a negative polarity, and a fourth data signal DS4 applied to the fourth data line DL4 maintains a high grayscale level NH of the negative polarity.

As shown in FIGS. 2B and 2C, when the display panel 100 displays a full white image and the display panel 100 is driven in the progressive driving method, the data signals applied to the data lines maintain a substantially uniform level so that a power consumption due to a change of levels of the data signal is very little.

In FIG. 3A, the display panel 100 displays a red image. Thus, the red subpixels have high grayscale levels and the green subpixels and the blue subpixels have low grayscale levels. In FIG. 3A, the display panel 100 is driven in a progressive driving method so that first to N-gate lines are progressively (e.g., successively) turned ON.

In FIG. 3B, the first data line DL1 has a positive polarity, and a first data signal DS1 applied to the first data line DL1 swings between a high grayscale level PH of the positive polarity and a low grayscale level PL of the positive polarity. The second data line DL2 has a negative polarity, and a second data signal DS2 applied to the second data line DL2 swings between a high grayscale level NH of the negative polarity and a low grayscale level NL of the negative polarity.

In FIG. 3C, the third data line DL3 has a positive polarity, and a third data signal DS3 applied to the third data line DL3 maintains a low grayscale level PL of the positive polarity. The fourth data line DL4 has a negative polarity, and a fourth data signal DS4 applied to the fourth data line DL4 swings between a high grayscale level NH of the negative polarity and a low grayscale level NL of the negative polarity.

As shown in FIGS. 3B and 3C, when the display panel 100 displays a red image and the display panel 100 is driven in the progressive driving method, the three data signals of four data signals applied to four data lines swing between the high grayscale level and the low grayscale level so that a power consumption due to a change of levels of the data signal is quite high.

When the display panel 100 is driven in the progressive driving method and the display panel 100 displays a green image, the data signals may swing between the high grayscale level and the low grayscale level in a similar manner to FIGS. 3A to 3C.

When the display panel 100 is driven in the progressive driving method and the display panel 100 displays a blue image, the data signals may swing between the high grayscale level and the low grayscale level in a similar manner to FIGS. 3A to 3C.

When the display panel 100 is driven in the progressive driving method and the display panel 100 displays a cyan image, the data signals may swing between the high grayscale level and the low grayscale level in a similar manner to FIGS. 3A to 3C.

When the display panel 100 is driven in the progressive driving method and the display panel 100 displays a magenta image, the data signals may swing between the high grayscale level and the low grayscale level in a similar manner to FIGS. 3A to 3C.

When the display panel 100 is driven in the progressive driving method and the display panel 100 displays a yellow image, the data signals may swing between the high grayscale level and the low grayscale level in a similar manner to FIGS. 3A to 3C.

In conclusion, when the display panel 100 is driven in the progressive driving method and the display panel 100 displays an image having a high saturation, the power consumption of the display apparatus may increase due to the swing of the data signals explained above.

Figure 6A:
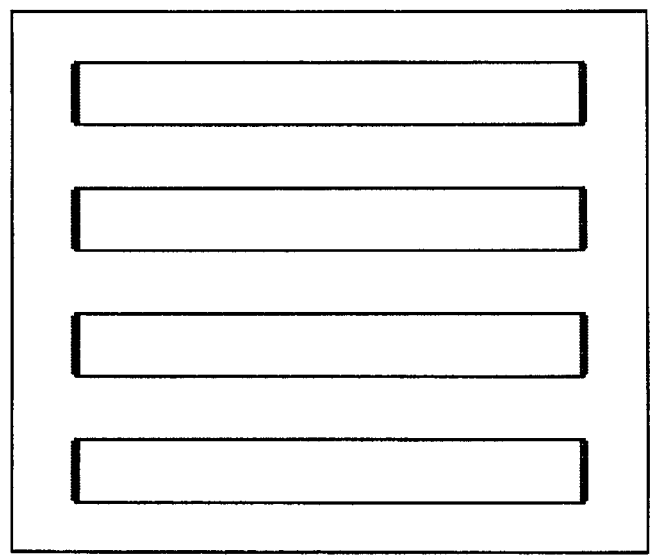
FIG. 6A is a plan view illustrating an interlace defect when the display panel of FIG. 1 displays a first image and an object in the first image rapidly displaces in a horizontal direction.
Figure 6B:
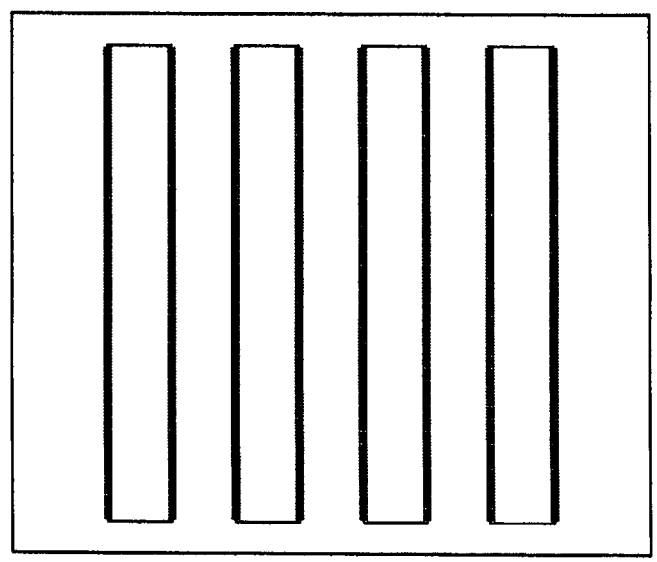
FIG. 6B is a plan view illustrating an interlace defect when the display panel of FIG. 1 displays a second image and an object in the second image rapidly displaces in a horizontal direction.
Figure 7A:
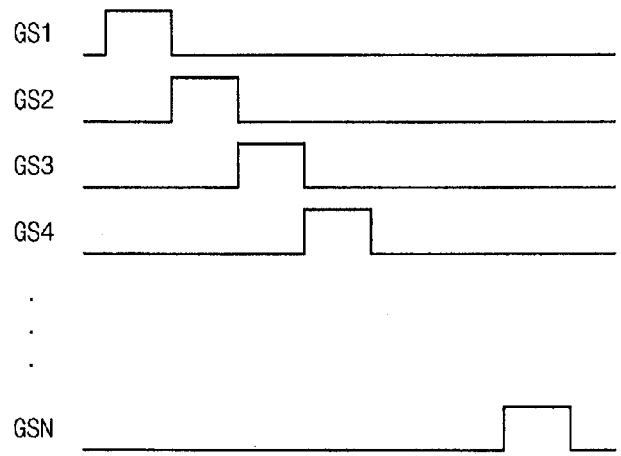
FIG. 7A is a waveform diagram illustrating a gate signal outputted from a gate driver of FIG. 1 in a progressive driving method, according to an example embodiment of the present inventive concept.
Figure 7B:
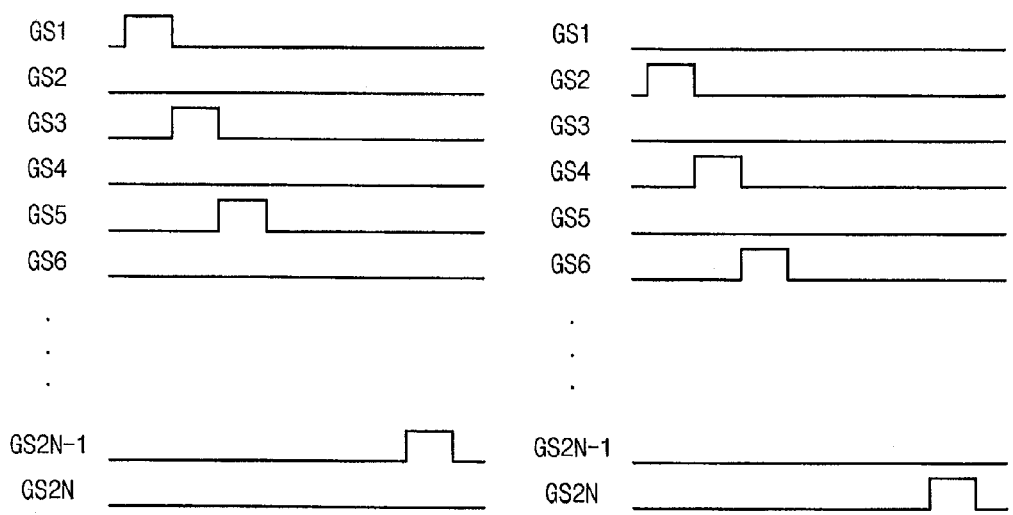
FIG. 7B is a waveform diagram illustrating a gate signal outputted from the gate driver of FIG. 1 in an interlace driving method, according to an example embodiment of the present inventive concept.

FIG. 4 is a block diagram illustrating the timing controller of FIG. 1, according to an example embodiment of the present inventive concept. FIG. 5 is a flowchart illustrating an operation of the timing controller of FIG. 1, according to an example embodiment of the present inventive concept. FIG. 6A is a plan view illustrating an interlace defect when the display panel of FIG. 1 displays a first image and an object in the first image rapidly displaces in a horizontal direction. FIG. 6B is a plan view illustrating an interlace defect when the display panel of FIG. 1 displays a second image and an object in the second image rapidly displaces in a horizontal direction. FIG. 7A is a waveform diagram illustrating a gate signal outputted from the gate driver of FIG. 1 in a progressive driving method, according to an example embodiment of the present inventive concept. FIG. 7B is a waveform diagram illustrating a gate signal outputted from the gate driver of FIG. 1 in an interlace driving method, according to an example embodiment of the present inventive concept.

Referring to FIGS. 1 to 7B, the timing controller 200 determines the driving method of the display panel 100 to one of the progressive driving method and the interlace driving method.

The timing controller 200 includes an image analyzing part 210, the driving method determining part 220 and an image processing part 230. The timing controller 200 analyzes the input image data RGB using the image analyzing part 210. The timing controller 200 determines the driving method of the display panel 100 as one of the progressive driving method and the interlace driving method based on the input image data RGB using the driving method determining part 220. The timing controller 200 rearranges the input image data RGB according to the determined one of progressive driving method and the interlace driving method to generate the data signal DATA using the image processing part 230.

The image analyzing part 210 determines the saturation of the pixels. The image analyzing part 210 generates a histogram of the saturation of the pixels (step S100).

For example, the saturation may be determined using a ratio between a minimum value among the grayscale level of the red subpixel, the grayscale level of the green subpixel and the grayscale level of the blue subpixel and a maximum value among the grayscale level of the red subpixel, the grayscale level of the green subpixel and the grayscale level of the blue subpixel.

When the saturation of the pixel is high, the maximum value among the grayscale level of the red subpixel, the grayscale level of the green subpixel and the grayscale level of the blue subpixel is much higher than the minimum value among the grayscale level of the red subpixel, the grayscale level of the green subpixel and the grayscale level of the blue subpixel. When the saturation of the pixel is high, the pixel may represent a color close to one of red, green, blue, cyan, magenta and yellow.

When the saturation of the pixel is low, the difference between the maximum value among the grayscale level of the red subpixel, the grayscale level of the green subpixel and the grayscale level of the blue subpixel and the minimum value among the grayscale level of the red subpixel, the grayscale level of the green subpixel and the grayscale level of the blue subpixel is relatively little. When the saturation of the pixel is low, the pixel may represent a color close to one of white, gray and black.

A horizontal axis of the histogram may be the saturation of the pixel, and a vertical axis of the histogram may be the number of the pixels which have the corresponding histogram saturation. The histogram may be formed per each frame.

The histogram may be generated based on weight WE of various colors. For example, when the pixel structure of the display panel 100 causes a high data signal swing when the red saturation is high, the red saturation may have a high weight WE. In the present pixel structure, weights WE for the red, green, blue, cyan, magenta and yellow may be substantially the same.

The image analyzing part 210 determines the saturation value of the frame based on the histogram (step S200). When an image in a frame represents a full white image as shown in FIG. 2A, the saturation histogram concentrates close to zero. Thus, the saturation value is very low. When an image in a frame represents a red image as shown in FIG. 3A, the saturation histogram concentrates close to a maximum value (e.g. 1). Thus, the saturation value is very high.

The driving method determining part 220 compares the saturation value of the frame to a saturation threshold (e.g., preset saturation threshold) TH (step S300). For example, when the saturation value of the frame is greater than the saturation threshold TH, the display panel 100 is driven in the interlace driving method (step S600); and when the saturation value of the frame is equal to or less than the saturation threshold TH, the display panel 100 is driven in the progressive driving method (step S500).

FIG. 7A illustrates the gate signals GS1 to GSN outputted from the gate driver 300 in the progressive driving method. In the progressive driving method, the first to N-th gate signals progressively having high levels and accordingly, the subpixels to which the first to N-th gate signals are applied are progressively (e.g., successively) turned ON.

FIG. 7B illustrates the gate signals GS1 to GSN outputted from the gate driver 300 in the interlace driving method. In the interlace driving method, odd numbered gate signals progressively (e.g., successively) assume high levels (e.g., progressively have high levels) and, accordingly, the subpixels to which the odd numbered gate signals are applied progressively (e.g., successively) turn ON during a first subframe. In the interlace driving method, even numbered gate signals progressively assume high levels and, accordingly, the subpixels to which the even numbered gate signals are applied progressively turn ON during a second subframe.

When the red image (shown in FIG. 3A) is displayed using the interlace driving method, the red subpixel R11 in the first subpixel row, which is coupled to (e.g., connected to) the first data line DL1, is charged and then the red subpixel R31 in the third subpixel row, which is coupled to the first data line DL1, is charged. Thus, the first data signal DS1 applied to the first data line DL1 does not swing but maintains the high grayscale level PH of the positive polarity. The green subpixel G11 in the first subpixel row, which is coupled to the second data line DL2, is charged and then the green subpixel G31 in the third subpixel row, which is coupled to the second data line DL2, is charged. Thus, the second data signal DS2 applied to the second data line DL2 does not swing but maintains the low grayscale level NL of the negative polarity.

When the display panel 100 displaying the image having the high saturation is selectively driven in the interlace driving method, the data signal does not swing but maintains a substantially uniform level so that a power consumption of the display apparatus due to the swing of the data signal may be reduced. When the display panel 100 displaying the image having low saturation is driven in the progressive driving method, the power consumption of the display apparatus may be maintained in a low level and a display defect, which may be generated in the interlace driving method, may be prevented. Thus, the display quality of the display panel 100 may be maintained at a high level.

The driving method determining part 220 may further determine the interlace defect. When the saturation value is greater than the saturation threshold TH, the driving method determining part 220 determines whether or not the input image data RGB generates the interlace defect or not (step S400).

For example, the interlace defect may be a combing defect. When an object in the input image data RGB rapidly displaces, a boundary line of the object of an odd image defined by the odd numbered gate line may be different from a boundary line of the object of an even image defined by the even numbered gate line, so that the combing defect may be generated.

In the interlace driving method, the odd numbered gate lines and the even numbered gate lines are independently driven in the different subframes. When the odd numbered gate lines and the even numbered gate lines are independently driven and the object in the image displaces, the combing defect may be generated.

FIG. 6A represents a combing defect in a first image IMAGE1, which includes four rectangles having longer sides in a horizontal direction. The combing defect is shown in shorter sides of the rectangles.

FIG. 6B represents a combing defect in a second image IMAGE2, which includes four rectangles having longer sides in a vertical direction. The combing defect is shown in the longer sides of the rectangles.

Comparing FIGS. 6A and 6B, the combing defect in FIG. 6B may be more perceptible by (e.g., seriously shown to) a user. When the saturation value is greater than the saturation threshold TH and the interlace defect is generated, the driving method determining part 220 may drive the display panel 100 in the progressive driving method. When the saturation value is greater than the saturation threshold TH and the interlace defect is not generated, the driving method determining part 220 may drive the display panel 100 in the interlace driving method. Alternatively, when the saturation value is greater than the saturation threshold TH and the degree of the interlace defect is not high, the driving method determining part 220 may drive the display panel 100 in the interlace driving method.

Therefore, when the image having the high saturation value is displayed, the interlace driving method is applied so that the swing of the data signal DATA may be reduced (e.g., prevented) and the power consumption may be reduced. When the display defect may be caused due to the interlace driving method, the progressive driving method is applied so that the display quality may be maintained in a high level.

In the interlace driving method, a memory 250 may be used to store an image. The memory 250 may be a frame buffer. Thus, when the display panel 100 is driven in the interlace driving method, the timing controller 200 may further include an image compressing part 240. The image compressing part 240 compresses the input image data RGB. The image compressing part 240 stores the compressed image at the memory 250. By utilizing the image compressing part 240, a size of the memory (e.g., available memory) 250 may decrease.

The timing controller 200 may further include an image compensating part to compensate the image of the input image data RGB. The image compensating part may perform ACC (adaptive color correction) and DCC (dynamic capacitance compensation) so that the image displayed on the display panel 100 may be improved.

The timing controller 200 may further include a signal generating part. The signal generating part generates the first control signal CONT1 for controlling a driving timing of the gate driver 300 and outputs the first control signal CONT1 to the gate driver 300. The signal generating part generates the second control signal CONT2 for controlling a driving timing of the data driver 500 and outputs the second control signal CONT2 to the data driver 500. The signal generating part generates the third control signal CONT3 for controlling a driving timing of the gamma reference voltage generator 400, and outputs the third control signal CONT3 to the gamma reference voltage generator 400.

The signal generating part may generate the first control signal CONT1 differently depending on the progressive driving method or the interlace driving method to be utilized.

In the present example embodiment, the timing controller 200 determines the image having the high saturation value that may generate frequent and high change of the data signal. The timing controller 200 determines the driving method of the display panel 100 based on the saturation value. However, the present invention is not limited thereto.

Alternatively, the timing controller 200 may directly calculate the difference of the data signals of the adjacent subpixels coupled to (e.g., connected to) the same data line. The timing controller 200 may accumulate (e.g., add or average) the difference of the data signals of the adjacent subpixels.

When the accumulated difference of the data signals is higher than a threshold, the display panel 100 is driven in the interlace driving method. When the accumulated difference of the data signals is equal to or less than the threshold, the display panel 100 is driven in the progressive driving method.

According to the present example embodiment, the timing controller 200 selectively applies the interlace driving method to the display panel 100 so that the power consumption of the display apparatus may be reduced and the display quality of the display panel 100 may be improved.

Figures 8A, 8B:
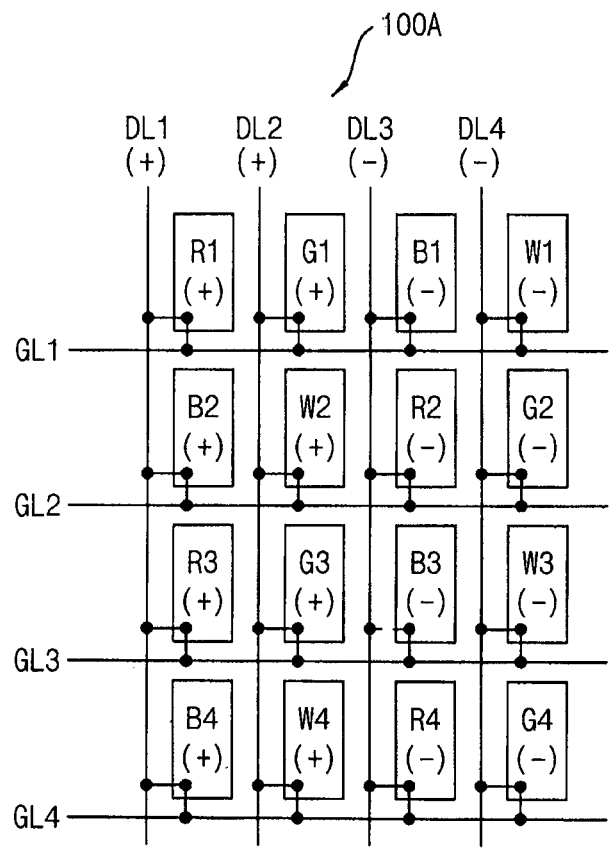
FIG. 8A is a plan view illustrating a pixel structure of a display panel, according to an example embodiment of the present inventive concept, when the display panel displays a full white image.
FIG. 8B is a waveform diagram illustrating a first data signal and a second data signal when the display panel of FIG. 8A displays the full white image.
Figure 8C:
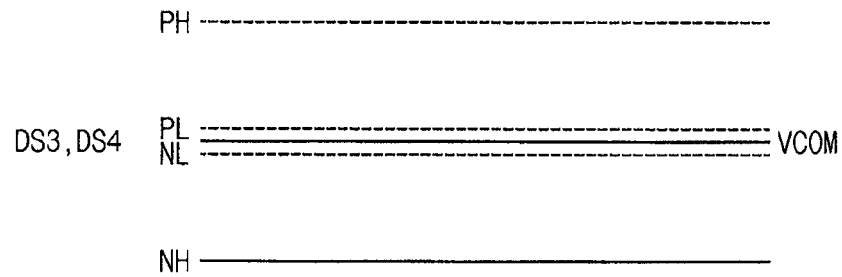
FIG. 8C is a waveform diagram illustrating a third data signal and a fourth data signal when the display panel of FIG. 8A displays the full white image.
Figure 9A:
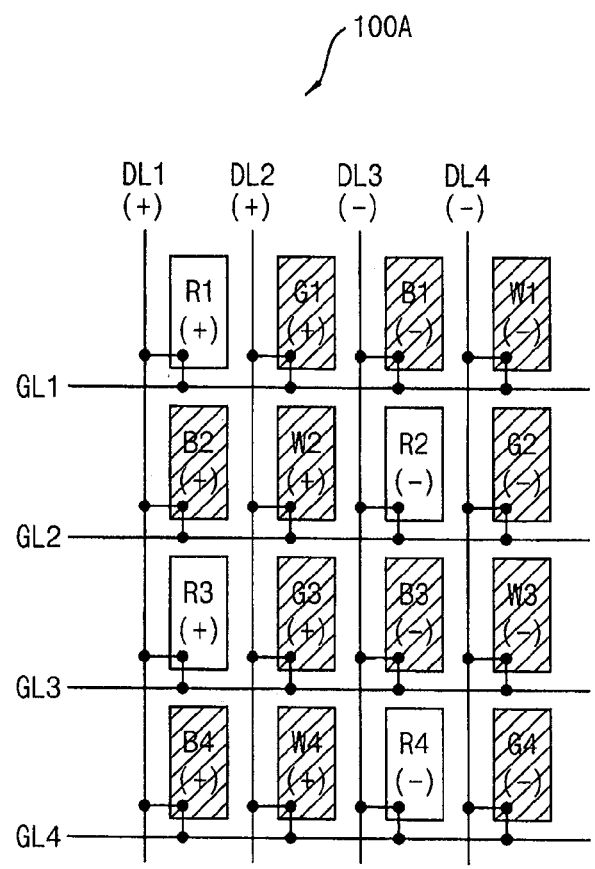
FIG. 9A is a plan view illustrating a pixel structure of the display panel of FIG. 8A when the display panel of FIG. 8A displays a red image, according to an example embodiment of the present inventive concept.
Figure 9B:
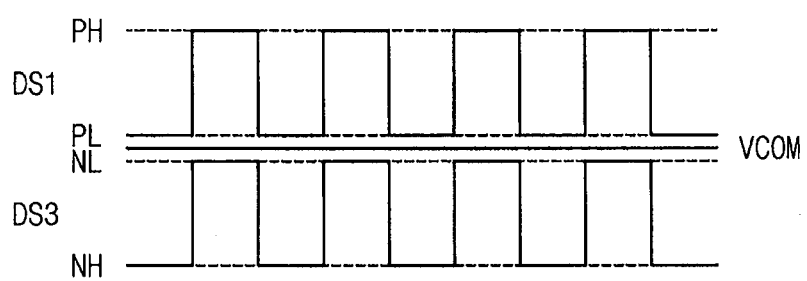
FIG. 9B is a waveform diagram illustrating a first data signal and a third data signal when the display panel of FIG. 8A displays the red image.
Figure 9C:
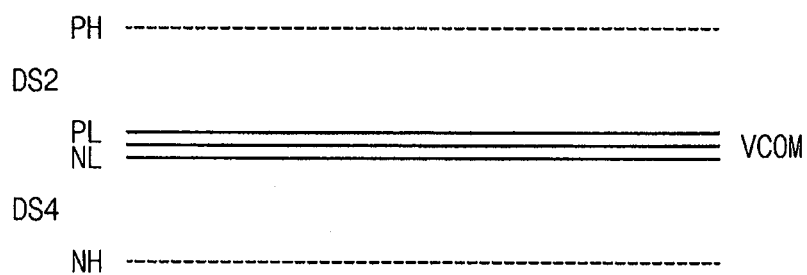
FIG. 9C is a waveform diagram illustrating a second data signal and a fourth data signal when the display panel of FIG. 8A displays the red image.

FIG. 8A is a plan view illustrating a pixel structure of a display panel, according to an example embodiment of the present inventive concept, when the display panel displays a full white image. FIG. 8B is a waveform diagram illustrating a first data signal and a second data signal when the display panel of FIG. 8A displays the full white image. FIG. 8C is a waveform diagram illustrating a third data signal and a fourth data signal when the display panel of FIG. 8A displays the full white image. FIG. 9A is a plan view illustrating a pixel structure of the display panel of FIG. 8A when the display panel of FIG. 8A displays a red image, according to an example embodiment of the present inventive concept. FIG. 9B is a waveform diagram illustrating a first data signal and a third data signal when the display panel of FIG. 8A displays the red image. FIG. 9C is a waveform diagram illustrating a second data signal and a fourth data signal when the display panel of FIG. 8A displays the red image.

The method of driving the display panel and the display apparatus according to the present example embodiment is substantially the same as the method of driving the display panel and the display apparatus of the previous example embodiment explained referring to FIGS. 1 to 7B except for the pixel structure. Thus, the same reference numerals will be used to refer to the same or like parts as those described in the previous example embodiment of FIGS. 1 to 7B and any repetitive explanation concerning the above elements may not be provided.

Referring to FIGS. 1, 4 to 9C, the display apparatus includes a display panel 100A and a panel driver. The panel driver includes a timing controller 200, a gate driver 300, a gamma reference voltage generator 400 and a data driver 500.

The display panel 100A includes a red subpixel, a green subpixel and a blue subpixel. A data line of the display panel 100A is sequentially coupled to the subpixels in one subpixel column. A polarity of a data signal applied to a first data line DL1 is the same as a polarity of a data signal applied to a second data line DL2 adjacent to the first data line DL1. A polarity of a data signal applied to a third data line DL3 adjacent to the second data line DL2 and a polarity of a data signal applied to a fourth data line DL4 adjacent to the third data line DL3 are each different from the polarity of the data line applied to the first data line DL1. Therefore, the display panel 100A is driven in a column inversion method in every two subpixel columns in an aspect of the data line. In addition, the data lines are coupled to the subpixels in respective subpixel columns so that the display panel 100A is driven in a column inversion method in every two subpixel columns in an example pixel.

A first subpixel row of the display panel 100A sequentially includes a first red subpixel R1, a first green subpixel G1, a first blue subpixel B1 and a first white subpixel W1. A second subpixel row of the display panel 100A sequentially includes a second blue subpixel B2, a second white subpixel W2, a second red subpixel R2 and a second green subpixel G2. The above subpixel group in a two by four matrix may be repeated along the first direction D1 and along the second direction D2 in the display panel 100A.

In FIG. 8A, the display panel 100A displays a full white image. Thus, the red subpixels, the green subpixels and the blue subpixels have high grayscale levels. In FIG. 8A, the display panel 100A is driven in a progressive driving method so that first to N-gate lines are progressively turned ON.

In FIG. 8B, the first data line DL1 and the second data line DL2 have a positive polarity, and a first data signal DS1 applied to the first data line DL1 and a second data signal DS2 applied to the second data line DL2 maintain high grayscale levels PH of the positive polarity.

In FIG. 8C, the third data line DL3 and the fourth data line DL4 have a negative polarity, and a third data signal DS3 applied to the third data line DL3 and a fourth data signal DS4 applied to the fourth data line DL4 maintain high grayscale level NH of the negative polarity.

As shown in FIGS. 8B and 8C, when the display panel 100A displays a full white image and the display panel 100A is driven in the progressive driving method, the data signals applied to the data lines maintain a substantially uniform level so that power consumption due to a change of levels of the data signal is very little.

In FIG. 9A, the display panel 100A displays a red image. Thus, the red subpixels have high grayscale levels but the green subpixels and the blue subpixels have low grayscale levels. In FIG. 9A, the display panel 100A is driven in a progressive driving method so that first to N-gate lines are progressively turned ON.

In FIG. 9B, the first data line DL1 has a positive polarity, and a first data signal DS1 applied to the first data line DL1 swings between a high grayscale level PH of the positive polarity and a low grayscale level PL of the positive polarity. The third data line DL3 has a negative polarity, and a third data signal DS3 applied to the third data line DL3 swings between a high grayscale level NH of the negative polarity and a low grayscale level NL of the negative polarity.

In FIG. 9C, the second data line DL2 has a positive polarity, and a second data signal DS2 applied to the second data line DL2 maintains a low grayscale level PL of the positive polarity. The fourth data line DL4 has a negative polarity, and a fourth data signal DS4 applied to the fourth data line DL4 maintains a low grayscale level NL of the negative polarity.

As shown in FIGS. 9B and 9C, when the display panel 100A displays a red image and the display panel 100A is driven in the progressive driving method, the two data signals of four data signals applied to four data lines swing between the high grayscale level and the low grayscale level so that a power consumption due to a change of levels of the data signal is quite high.

When the display panel 100A is driven in the progressive driving method and the display panel 100A displays a green image, the data signals may swing between the high grayscale level and the low grayscale level in a similar manner to FIGS. 9A to 9C.

When the display panel 100A is driven in the progressive driving method and the display panel 100A displays a blue image, the data signals may swing between the high grayscale level and the low grayscale level in a similar manner to FIGS. 9A to 9C.

When the display panel 100A is driven in the progressive driving method and the display panel 100A displays a cyan image, the data signals may swing between the high grayscale level and the low grayscale level in a similar manner to FIGS. 9A to 9C. In this case, all data signals among four data signals applied to four data lines swing between the high grayscale level and the low grayscale level so that power consumption is about twice as high as the power consumption in FIGS. 9A to 9C.

When the display panel 100A is driven in the progressive driving method and the display panel 100A displays a yellow image, the data signals may swing between the high grayscale level and the low grayscale level in a similar manner to FIGS. 9A to 9C. In this case, all data signals among four data signals applied to four data lines swing between the high grayscale level and the low grayscale level so that power consumption is about twice as high as the power consumption in FIGS. 9A to 9C.

However, unlike FIGS. 9A to 9C, when the display panel 100A is driven in the progressive driving method and the display panel 100A displays a magenta image, the data signals may not swing between the high grayscale level and the low grayscale level.

In conclusion, when the display panel 100A is driven in the progressive driving method and the display panel 100A displays an image having a high saturation, the power consumption of the display apparatus may increase due to the swing of the data signals explained above.

When the display panel 100A displays a yellow image and a cyan image, the power consumption is relatively high. When the display panel 100A displays a red image, a green image and a blue image, the power consumption is quite high but less than the power consumption when displaying a yellow image and a cyan image. When the display panel 100A displays a magenta image, the power consumption is very low.

In conclusion, although the saturation value is the same, the power consumption of the display apparatus may vary according to the color. Thus, a weight WE of the color may be applied. For example, a weight WE for cyan and yellow may be a first weight. A weight WE for red, green, and blue may be a second weight, less than the first weight. A weight WE for magenta may be zero. The first weight may be twice as the second weight.

The timing controller 200 determines the driving method of the display panel 100A as one of the progressive driving method and the interlace driving method.

The timing controller 200 includes an image analyzing part 210, the driving method determining part 220 and an image processing part 230. The timing controller 200 analyzes the input image data RGB using the image analyzing part 210. The timing controller 200 determines the driving method of the display panel 100A as one of the progressive driving method and the interlace driving method based on the input image data RGB using the driving method determining part 220. The timing controller 200 rearranges the input image data RGB according to the determined one of the progressive driving method and the interlace driving method to generate the data signal DATA using the image processing part 230.

The image analyzing part 210 determines the saturation of the pixels. The image analyzing part 210 generates a histogram of the saturation of the pixels (step S100).

For example, the saturation may be determined using a ratio between a minimum value among the grayscale level of the red subpixel, the grayscale level of the green subpixel and the grayscale level of the blue subpixel and a maximum value among the grayscale level of the red subpixel, the grayscale level of the green subpixel and the grayscale level of the blue subpixel.

As explained above, the histogram may be generated based on weights WE of various color.

The image analyzing part 210 determines the saturation value of the frame based on the histogram (step S200).

The driving method determining part 220 compares the saturation value of the frame to a saturation threshold (e.g., preset saturation threshold) TH (step S300). For example, when the saturation value of the frame is greater than the saturation threshold TH, the display panel 100A is driven in the interlace driving method (step S600); and when the saturation value of the frame is equal to or less than the saturation threshold TH, the display panel 100A is driven in the progressive driving method (step S500).

In the progressive driving method, the first to N-th gate signals progressively having high levels and accordingly, the subpixels to which the first to N-th gate signals are applied are progressively turned ON.

In the interlace driving method, odd numbered gate signals progressively have high levels and, accordingly, the subpixels to which the odd numbered gate signals are applied are progressively turned ON during a first subframe. In the interlace driving method, even numbered gate signals progressively have high levels and, accordingly, the subpixels to which the even numbered gate signals are applied are progressively turned ON during a second subframe.

When the red image (shown in FIG. 9A) is displayed using the interlace driving method, the red subpixel R1 in the first subpixel row, which is coupled to (e.g., connected to) the first data line DL1, is charged and then the red subpixel R3 in the third subpixel row, which is coupled to the first data line DL1, is charged. Thus, the first data signal DS1 applied to the first data line DL1 does not swing but maintains the high grayscale level PH of the positive polarity. The blue subpixel B1 in the first subpixel row, which is coupled to the third data line DL3, is charged and then the blue subpixel B3 in the third subpixel row, which is coupled to the third data line DL3, is charged. Thus, the third data signal DS3 applied to the third data line DL3 does not swing but maintains the low grayscale level NL of the negative polarity.

When the display panel 100A displaying the image having the high saturation is selectively driven in the interlace driving method, the data signal does not swing and maintains a substantially uniform level so that a power consumption of the display apparatus due to the swing of the data signal may be reduced. In contrast, when the display panel 100A displaying the image having the low saturation is driven in the progressive driving method, the power consumption of the display apparatus may be maintained in a low level and a display defect, which may be generated in the interlace driving method, may be prevented. Thus, the display quality of the display panel 100A may be maintained in a high level.

The driving method determining part 220 may further determine the interlace defect. When the saturation value is greater than the saturation threshold TH, the driving method determining part 220 determines whether or not the input image data RGB generates the interlace defect or not (step S400).

According to the present example embodiment, the timing controller 200 selectively applies the interlace driving method to the display panel 100 so that the power consumption of the display apparatus may be reduced and the display quality of the display panel 100 may be improved (e.g., increased).

According to the present example embodiment, a power consumption of the display apparatus may be reduced and a display quality of the display panel may be improved.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, and equivalents thereof.

What is claimed is:

1. A method of driving a display panel, the method comprising:
    analyzing input image data by determining a saturation value of a frame;
    determining a driving method of the display panel as one of a progressive driving method and an interlace driving method by:
        determining the driving method as the interlace driving method when the saturation value of the frame is greater than a saturation threshold; and
        determining the driving method as the progressive driving method when the saturation value of the frame is equal to or less than the saturation threshold; and
    rearranging the input image data according to the determined one of the progressive driving method and the interlace driving method.

2. The method of claim 1, wherein the analyzing of the input image data further comprises:
    determining saturation of pixels; and
    generating a saturation histogram of the pixels,
    wherein the determining the saturation value of the frame comprises determining the saturation value of the frame based on the saturation histogram.

3. The method of claim 2, wherein a pixel of the pixels comprises a red subpixel, a green subpixel and a blue subpixel, and
    the saturation of the pixel is determined utilizing a ratio between a minimum value among a grayscale level of the red subpixel, a grayscale level of the green subpixel, and a grayscale level of the blue subpixel, and a maximum value among the grayscale level of the red subpixel, the grayscale level of the green subpixel and the grayscale level of the blue subpixel.

4. The method of claim 2, wherein the generating of the saturation histogram of the pixels comprises setting weights of various colors.

5. The method of claim 2, wherein the determining of the driving method of the display panel comprises comparing the saturation value of the frame to the saturation threshold.

6. The method of claim 1, wherein the display panel comprises a plurality of subpixels comprising a red subpixel, a green subpixel and a blue subpixel,
    a data line of the display panel is alternately coupled to the subpixels in adjacent two subpixel columns, and
    a polarity of a data signal applied to a first data line is different from a polarity of a data signal applied to a second data line.

7. The method of claim 6, wherein a P-th data line of the display panel is coupled to a red subpixel in a first subpixel row and a P-th subpixel column, a blue subpixel in a second subpixel row and a (P−1)-th subpixel column, a red subpixel in a third subpixel row and the P-th subpixel column and a blue subpixel in a fourth subpixel row and the (P−1)-th subpixel column,
    a (P+1)-th data line of the display panel is coupled to a green subpixel in the first subpixel row and a (P+1)-th subpixel column, a red subpixel in the second subpixel row and the P-th subpixel column, a green subpixel in the third subpixel row and the (P+1)-th subpixel column and a red subpixel in the fourth subpixel row and the P-th subpixel column, and
    a (P+2)-th data line of the display panel is coupled to a blue subpixel in the first subpixel row and a (P+2)-th subpixel column, a green subpixel in the second subpixel row and the (P+1)-th subpixel column, a blue subpixel in the third subpixel row and the (P+2)-th subpixel column and a green subpixel in the fourth subpixel row and the (P+1)-th subpixel column.

8. The method of claim 1, wherein the analyzing the input image data further comprises:
    determining saturation of pixels; and
    generating a saturation histogram of the pixels,
    wherein the generating the saturation histogram of the pixels comprises setting weights of colors, and
    wherein the weights for red, green, blue, cyan, magenta and yellow are substantially the same.

9. The method of claim 1, wherein the display panel comprises a red subpixel, a green subpixel and a blue subpixel,
    a data line of the display panel is sequentially coupled to the subpixels in one subpixel column,
    a polarity of a data signal applied to a first data line is a same as a polarity of a data signal applied to a second data line adjacent to the first data line, and
    a polarity of a data signal applied to a third data line adjacent to the second data line and a polarity of a data signal applied to a fourth data line adjacent to the third data line are different from the polarity of the data signal applied to the first data line.

10. The method of claim 9, wherein a first subpixel row of the display panel sequentially comprises a first red subpixel, a first green subpixel, a first blue subpixel and a first white subpixel, and
    a second subpixel row of the display panel sequentially comprises a second blue subpixel, a second white subpixel, a second red subpixel and a second green subpixel.

11. The method of claim 10, further comprising compressing the input image when the display panel is driven in the interlace driving method; and
    storing the compressed input image to a memory.

12. The method of claim 1, wherein the analyzing the input image data further comprises:
    determining saturation of pixels; and
    generating a saturation histogram of the pixels,
    wherein the generating the saturation histogram of the pixels comprises setting weights of various colors, and
    wherein a weight for cyan and yellow is a first weight, a weight for red, green and blue is a second weight less than the first weight, and a weight for magenta is zero.

13. A method of driving a display panel, the method comprising:
analyzing input image data;
determining a driving method of the display panel as one of a progressive driving method and an interlace driving method; and
rearranging the input image data according to the determined one of the progressive driving method and the interlace driving method;
wherein the analyzing of the input image data comprising:
determining saturation of pixels;
generating a saturation histogram of the pixels; and
determining a saturation value of a frame based on the saturation histogram,
wherein the determining of the driving method of the display panel comprises comparing the saturation value of the frame to a saturation threshold, and
wherein the determining the driving method of the display panel further comprises determining whether or not the input image data generates an interlace defect when the saturation value of the frame is greater than the saturation threshold.

14. The method of claim 13, wherein the interlace defect is a combing defect, and
the combing defect is generated when an object in the input image data rapidly displaces and a boundary line of the object of an odd image defined by an odd numbered gate line is different from a boundary line of the object of an even image defined by an even numbered gate line.

15. The method of claim 13, wherein the determining of the driving method of the display panel further comprises:
determining the driving method as the progressive driving method when the saturation value of the frame is greater than the saturation threshold and the interlace defect is generated, and
determining the driving method as the interlace driving method when the saturation value of the frame is greater than the saturation threshold and the interlace defect is not generated.

16. A method of driving a display panel, the method comprising:
analyzing input image data;
determining a driving method of the display panel as one of a progressive driving method and an interlace driving method; and
rearranging the input image data according to the determined one of the progressive driving method and the interlace driving method,
wherein the analyzing the input image data comprises:
calculating a difference of data signals of adjacent subpixels coupled to a same data line; and
accumulating the difference of the data signals of the adjacent subpixels.

17. The method of claim 16, wherein the determining of the driving method of the display panel further comprises:
determining the driving method as the interlace driving method when the accumulated difference of the data signals is greater than a threshold, and
determining the driving method as the progressive driving method when the accumulated difference of the data signal is equal to or less than the threshold.

18. A display apparatus comprising:
a display panel driver comprising:
an image analyzing part configured to analyze input image data by determining a saturation value of a frame;
a driving method determining part configured to determine a driving method of the display panel as one of a progressive driving method and an interlace driving method by:
determining the driving method as the interlace driving method when the saturation value of the frame is greater than a saturation threshold; and
determining the driving method as the progressive driving method when the saturation value of the frame is equal to or less than the saturation threshold; and
an image processing part configured to rearrange the input image data according to the determined one of the progressive driving method and the interlace driving method; and
a display panel configured to display image based on a data signal outputted from the image processing part.

* * * * *